United States Patent
Thulke

(10) Patent No.: US 8,249,852 B2
(45) Date of Patent: Aug. 21, 2012

(54) CONDITION MONITORING OF WINDTURBINES

(75) Inventor: Matthias Thulke, Berlin (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/111,023

(22) Filed: May 19, 2011

(65) Prior Publication Data
US 2012/0029892 A1 Feb. 2, 2012

(51) Int. Cl.
*G06G 7/54* (2006.01)
*F03D 9/00* (2006.01)
*H02P 9/04* (2006.01)

(52) U.S. Cl. ............................. 703/18; 290/44
(58) Field of Classification Search .................... 703/18; 290/44
See application file for complete search history.

(56) References Cited

U.S. PATENT DOCUMENTS

| 7,523,001 B2 * | 4/2009 | Morjaria et al. ............ 702/3 |
| 2004/0026929 A1 * | 2/2004 | Rebsdorf et al. ............ 290/44 |
| 2007/0029255 A1 * | 2/2007 | D'Amato et al. ............ 210/637 |
| 2008/0307853 A1 * | 12/2008 | Siebers et al. ............ 73/1.29 |
| 2010/0138267 A1 * | 6/2010 | Vittal et al. ............ 705/8 |
| 2011/0106510 A1 * | 5/2011 | Poon ............ 703/2 |
| 2011/0224926 A1 * | 9/2011 | Morjaria et al. ............ 702/60 |
| 2011/0270450 A1 * | 11/2011 | Gujjar et al. ............ 700/287 |

OTHER PUBLICATIONS

Barakati, S. Masoud et al., "Maximum Power Tracking Control for a Wind Turbine System Including a Matrix Converter", Sep. 2009, IEEE Transactions on Energy Conversion, vol. 24, No. 3.*

* cited by examiner

*Primary Examiner* — Kandasamy Thangavelu
*Assistant Examiner* — Cedric D Johnson
(74) *Attorney, Agent, or Firm* — Global Patent Operation; Douglas D. Zhang

(57) ABSTRACT

A method for monitoring a wind turbine is provided. The method includes defining at least one subsystem of the wind turbine and providing a simulation model for the at least one subsystem. During normal operation of the wind turbine at least an input parameter of the at least one subsystem is determined a behavior of the at least one subsystem is simulated using the at least one input parameter as an input of the simulation model. Based on the simulated behavior, it is determined, if the at least one subsystem operates within a given specification.

18 Claims, 12 Drawing Sheets

CONDITION MONITORING OF WINDTURBINES

BACKGROUND OF THE INVENTION

The subject matter described herein relates generally to methods and systems for condition monitoring of wind turbines, and more particularly, to methods and systems for monitoring the behavior of wind turbines or parts thereof during operation.

At least some known wind turbines include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity.

Wind turbines are typically rated to operate 20 years or even longer. Often they are working in a hostile environment, for example in a off-shore wind park, with high temperature cycles, and at high and strongly fluctuating wind speeds. This typically results in high loads which may reduce the life time of the wind turbine and their components, respectively. For example, a gearbox arranged inside the nacelle as part of the wind turbines drivetrain as well as the bearings of the drivetrain may have live times of only a few years due to heavy loads caused by rapid changes of wind speed and/or wind direction.

Furthermore, expected live times of wind turbine components may deviate from the actual life times under fluctuating external conditions which are typically only approximately known during design of the wind turbine and the wind park, respectively. According to the industrial standard IEC 61400-1, the wind turbines are designed and checked to bear the external conditions on site. However, these conditions are either based on short-term measurements on site or on long-term measurements of weather station nearby and may thus be not sufficiently reliable. For safety reasons, wind turbines are, therefore, typically inspected and maintained, respectively, in comparatively short regular intervals. This typically increases maintenance costs and down times of the wind turbine. Furthermore, possible margins of the live time of wind turbine components may not fully be used.

Transducers based condition monitoring systems for detecting drivetrain issues during wind turbine operation may be used. However, these systems may be very complex and/or may only detect progressed wear or attrition of drivetrain components.

In view of the above, there is a desire for wind turbine and a method for monitoring conditions of the wind turbine which allow for a sensitive and reliable assessment of loads and remaining life time of the wind turbine and/or the wind turbine components.

BRIEF DESCRIPTION OF THE INVENTION

In one aspect, a method for monitoring a wind turbine is provided. The method includes defining at least one subsystem of the wind turbine and providing a simulation model for the at least one subsystem. During normal operation of the wind turbine at least an input parameter of the at least one subsystem is determined A behavior of the at least one subsystem is simulated using the at least one input parameter as an input of the simulation model. Based on the simulated behavior, it is determined, if the at least one subsystem operates within a given specification.

In another aspect, a method for monitoring a wind turbine is provided. The method includes defining at least one subsystem of the wind turbine and providing a simulation model for the at least one subsystem. During normal operation of the wind turbine, an input signal and an actual output signal of the at least one subsystem are received. An expected output signal of the at least one subsystem is determined using the input signal as an input of the simulation model. The actual output signal and the expected output signal are compared. Based on the comparison it is determined, if the first subsystem operates within a given specification.

In yet another aspect, a system for monitoring a wind turbine is provided. The system includes a simulation module which is configured to simulate, during normal operation of a wind turbine, a behavior of at least one subsystem of the wind turbine. The simulation module is configured to determine, based on the simulated behavior, if the at least one subsystem operates within given a specification. Further, the simulation module is configured to send a message to a turbine controller of the wind turbine when the at least one subsystem is determined not to operate within the given specification Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system including a simulation module for simulating a behavior and/or a remaining life time of the wind turbine and/or a subsystem of the wind turbine during normal operation that allows for estimating if a maintenance is required and/or if an operational parameter of the wind turbine is to be changed.

Figure 1:
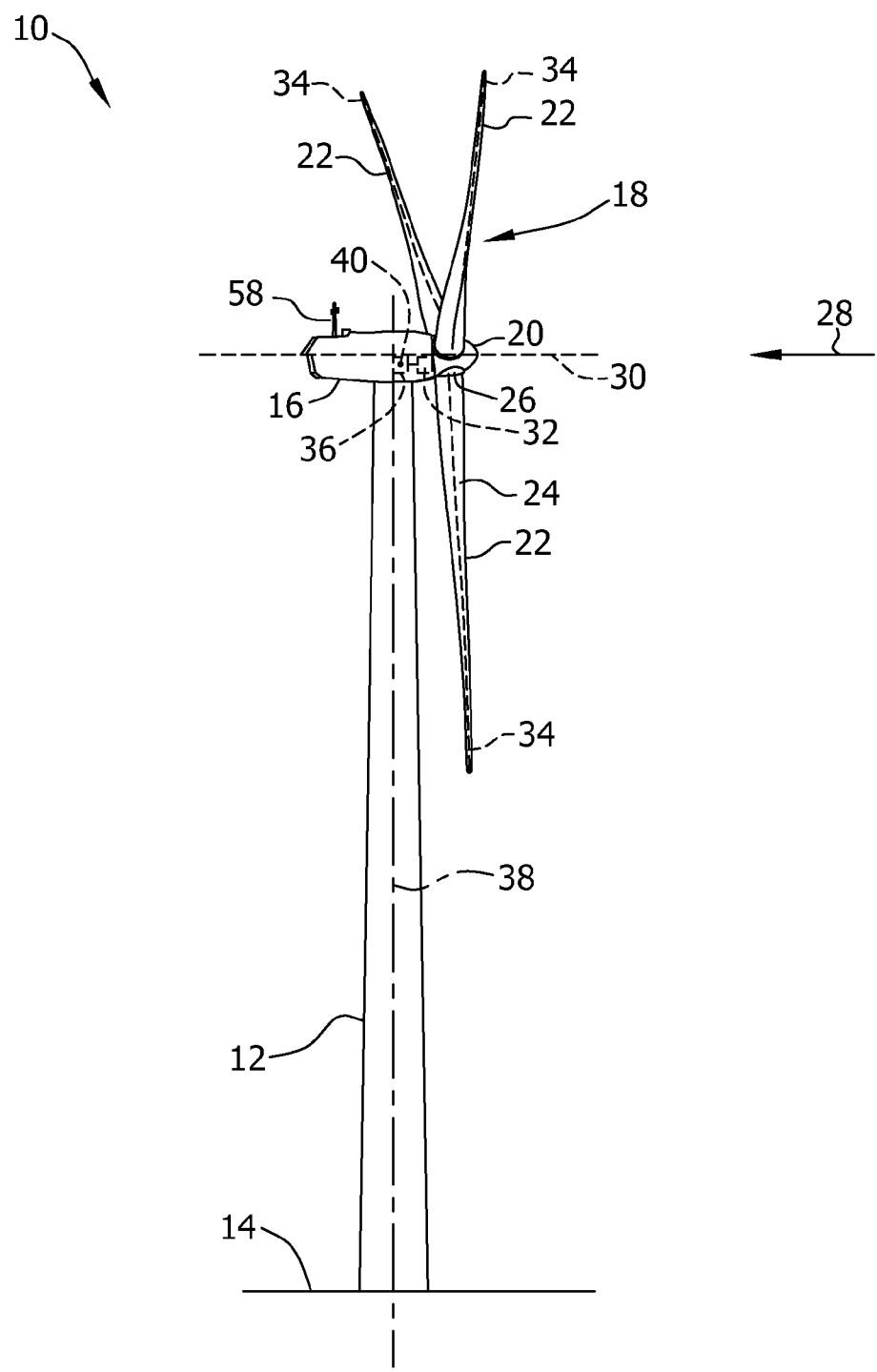
FIG. 1 is a perspective view of an exemplary wind turbine.
Figure 2:
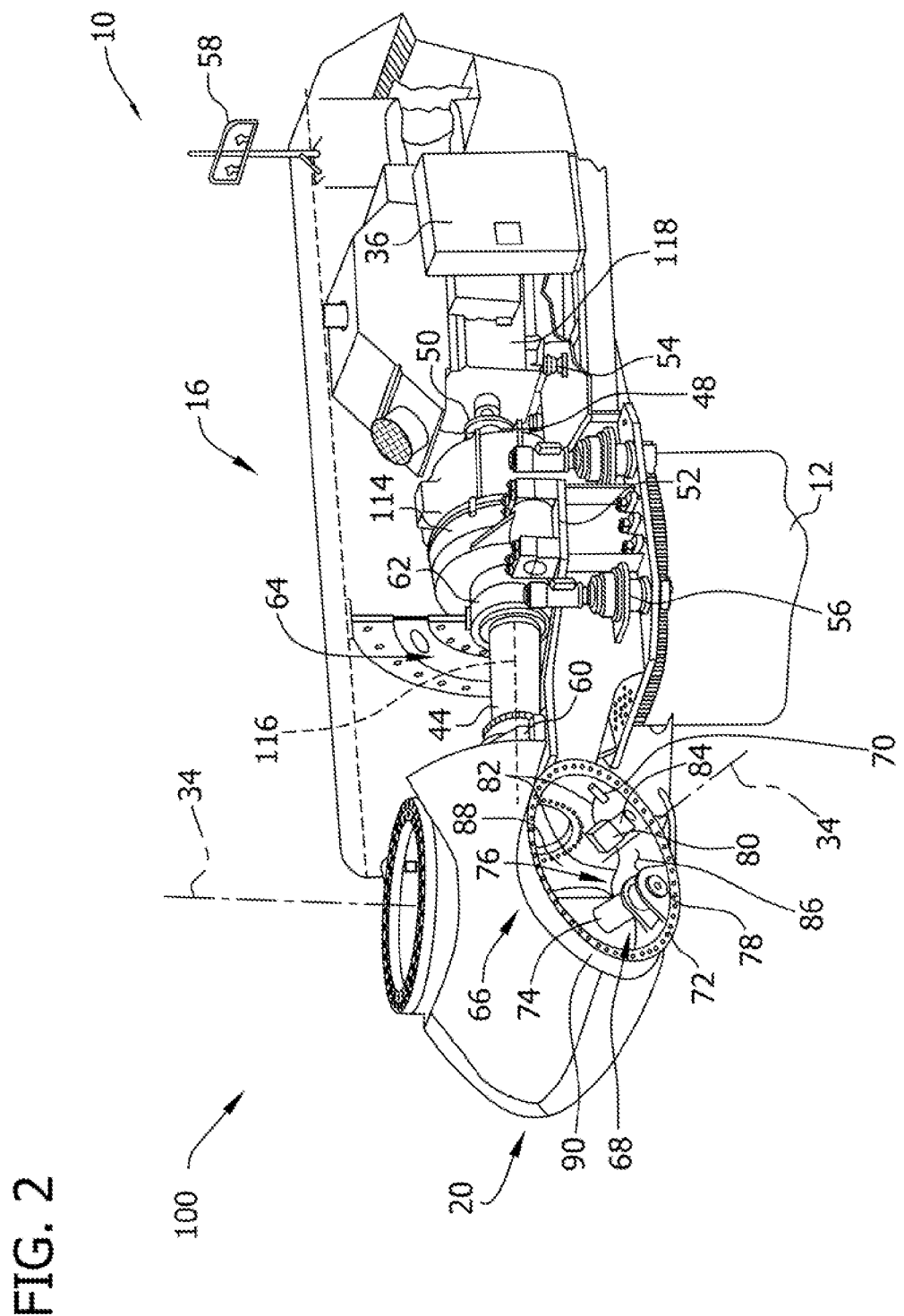
FIG. 2 is an enlarged sectional view of a portion of the wind turbine shown in FIG. 1.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "subsystem of a wind turbine" is intended to be representative of a set of elements of the wind turbine, which is a system itself and a part of the wind turbine. Examples include, without being limited thereto, a pitch system, a yaw system, a gearbox, a generator system, a power conversion system, a transformer system, a tower, a nacelle, as well as parts or combinations thereof. For example, a low speed shaft, the gearbox, a high speed shaft and the generator system are part of a drivetrain also forming a subsystem of the wind turbine. Typically, any part of the wind turbine illustrated in the drawings and denoted by a reference numeral forms a subsystem of the wind turbine. The subsystems may include and/or may be formed by, respectively, an active component of the wind turbine. As used herein, the term "active component of a wind turbine" is intended to be representative of a device of the wind turbine for moving or controlling the wind turbine or a part of the wind turbine. Typically, the active component of the wind turbine is configured to receive a setpoint of a condition of the active component, the subsystem the active component belongs to, and/or the wind turbine, respectively. For example, a pitch system as illustrated in FIGS. 1 and 2 may form a subsystem with at least one pitch drive as an active component for changing a pitch angle of a blade. During operation of the wind turbine, a turbine controller typically issues setpoints for the pitch angle to the pitch system. Furthermore, the active component of the wind turbine is typically configured to change the condition of the active component, the subsystem the active component belongs to, and/ or the wind turbine, respectively. Examples of active components include, without being limited thereto, switches, a pitch system, a yaw system, a gearbox, a generator system, a power conversion system, and a transformer system. As used herein, the term "condition" of a wind turbine or a part therefor is intended to be representative of an operational status, of a behavior, and/or a status. The status may for example be a degree of wear or an operating time of the wind turbine and the part thereof, respectively.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Nacelle 16 also includes at least one meteorological mast 58 that includes a wind vane and anemometer (neither shown in FIG. 1). Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 118 positioned within nacelle 16 by rotor shaft 44 (sometimes referred to as either a main shaft or a low speed shaft), a gearbox 114, a high speed shaft 48, and a coupling 50. In the exemplary embodiment, rotor shaft 44 is disposed coaxial to longitudinal axis 116. Rotation of rotor shaft 44 rotatably drives gearbox 114 that subsequently drives high speed shaft 48. High speed shaft 48 rotatably drives generator 118 with coupling 50 and rotation of high speed shaft 48 facilitates production of electrical power by generator 118. Gearbox 114 and generator 118 are supported by a support 52 and a support 54. In the exemplary embodiment, gearbox 46 utilizes a dual path geometry to drive high speed shaft 48. Alternatively, rotor shaft 44 is coupled directly to generator 118 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 114 and/or generator 118. Alternatively, nacelle 16 includes any number of support bearings that enable wind turbine 10 to function as disclosed herein. Rotor shaft 44, generator 118, gearbox 114, high speed shalt 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Sensor 70 may be configured to measure a corresponding pitch angle of associated rotor blade 22. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device.

During normal operation of wind turbine 10, control system 36 controls pitch drive system 68 to adjust a pitch of rotor blade 22. Typically, wind turbine 10 feeds active and/or reactive power into a grid during normal operation, for example in a wind farm. In one embodiment, when rotor 18 operates at a rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
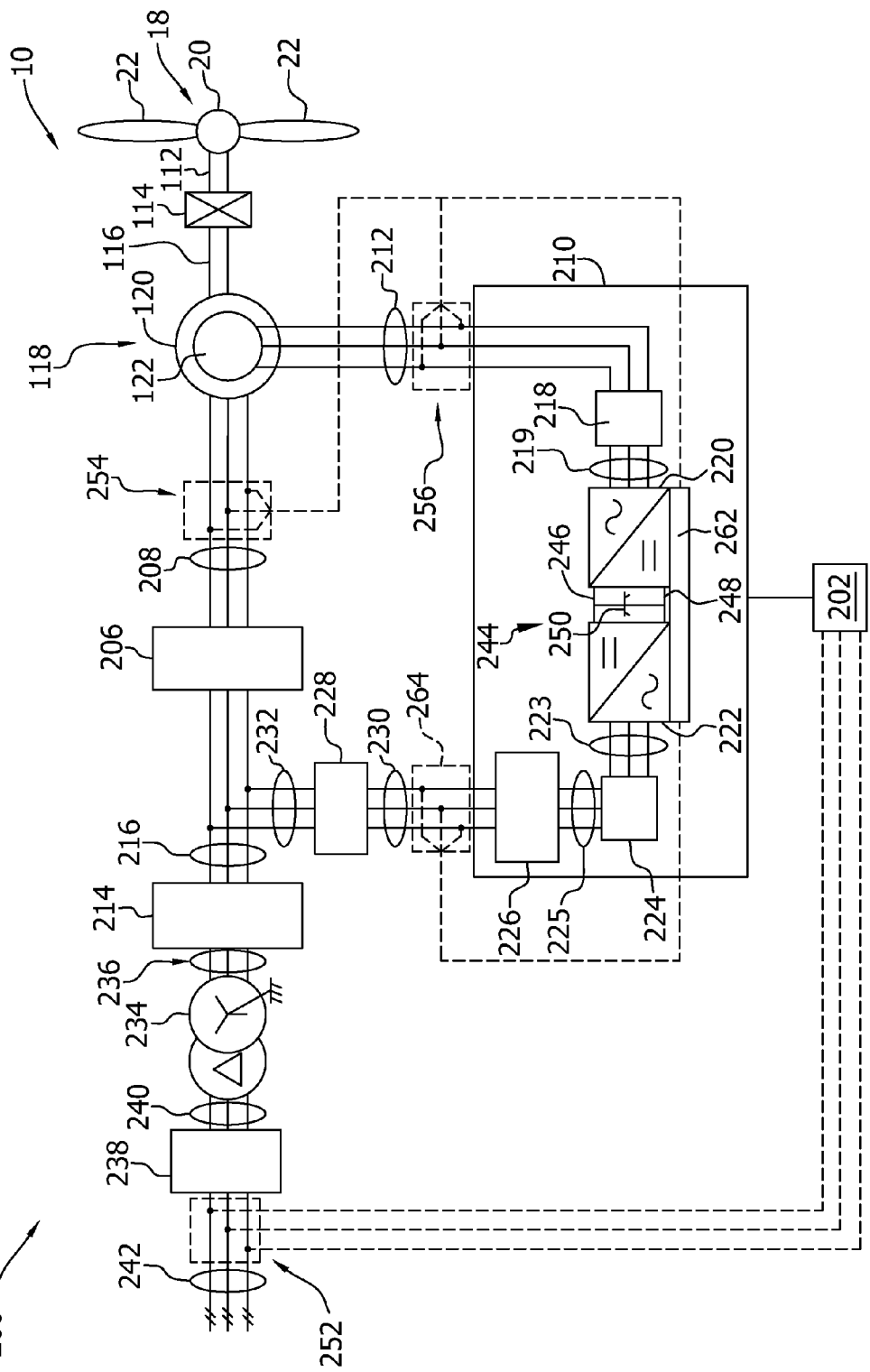
FIG. 3 is a schematic view of an exemplary electrical and control system suitable for use with the wind turbine shown in FIG. 1.

FIG. 3 is a schematic view of an exemplary electrical and control system 200 that may be used with wind turbine 10. Rotor 18 includes blades 22 coupled to hub 20. Rotor 18 also includes a low-speed shaft 112 rotatably coupled to hub 20. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 10 includes a direct-drive generator that is rotatably coupled to rotor 18 without any intervening gearbox.

High-speed shaft 116 is rotatably coupled to generator 118. In the following the generator 118 is also referred to as generator system. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 3). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 3), and these terms are used interchangeably herein. In the exemplary embodiment, memory may include, but is not limited to, a computer-readable medium, such as a random access memory (RAM) (none shown in FIG. 3). Alternatively, one or more storage devices, such as a floppy disk, a compact disc read only memory (CD-ROM), a magneto-optical disk (MOD), and/or a digital versatile disc (DVD) (none shown in FIG. 3) may also be used. Also, in the exemplary embodiment, additional input channels (not shown in FIG. 3) may be, but are not limited to, computer peripherals associated with an operator interface such as a mouse and a keyboard (neither shown in FIG. 3). Further, in the exemplary embodiment, additional output channels may include, but are not limited to, an operator interface monitor (not shown in FIG. 3).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 3) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 3) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 3). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 3, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 22 and blades 22 transform wind energy into a mechanical rotational torque that rotatably drives low-speed shaft 112 via hub 20. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power, and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 3) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 4:
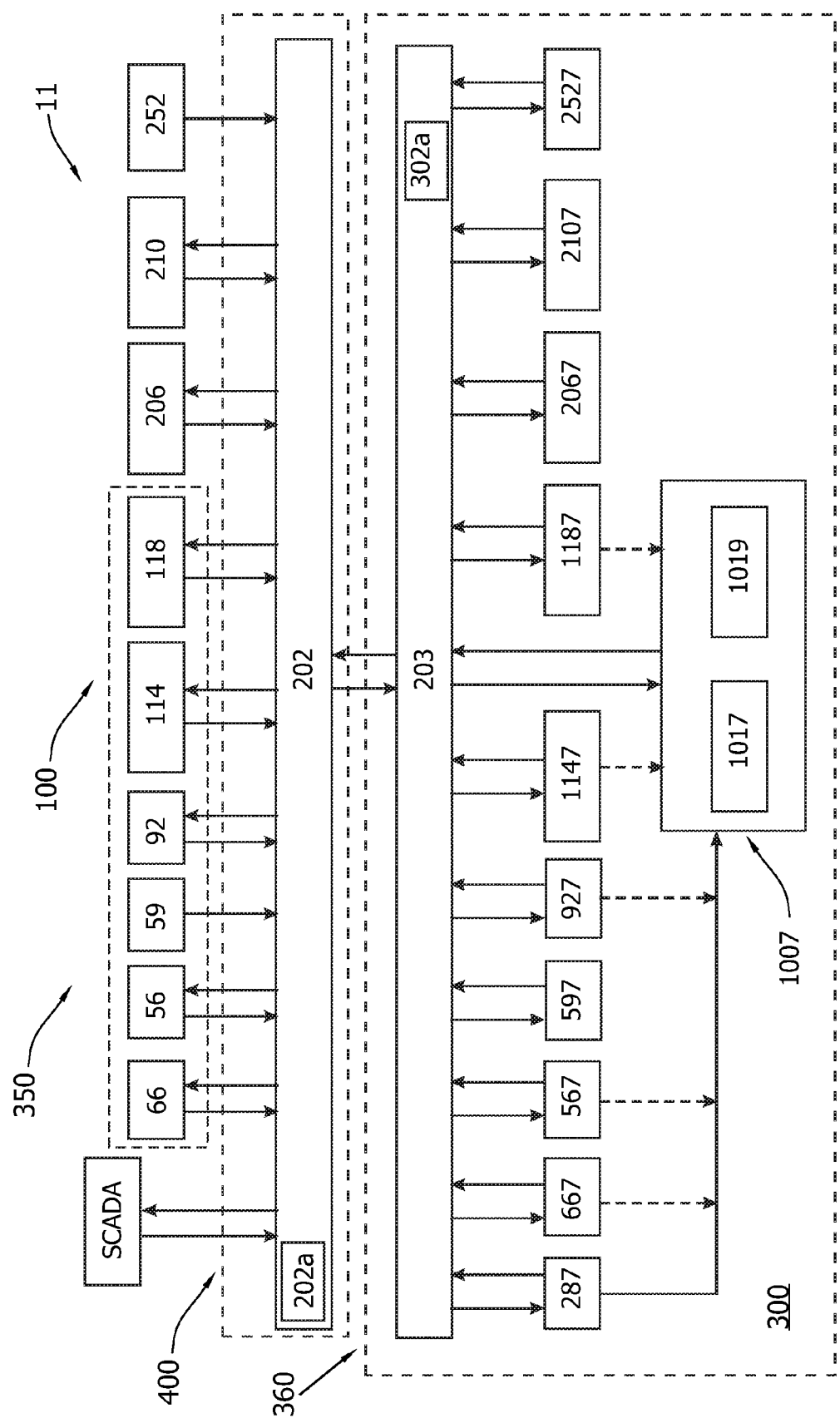
FIG. 4 illustrates a wind turbine, a control system and a simulation module according to an embodiment.

FIG. 4 shows a control system 350 of a wind turbine 11 according to an embodiment. The control system 350 is configured to control wind turbine 11 and the subsystems of wind turbine 11, respectively.

According to an embodiment, control system 350 includes a control module 400 for controlling wind turbine 11 and a system 360 for monitoring wind turbine 11 during operation, i.e. a monitoring system 360. Monitoring system 360 includes a simulation module 300 for simulating a behavior of wind turbine 11. In the exemplary embodiment illustrated in FIG. 4, a turbine controller 202 controls, as part of the control module 400, a yaw drive mechanism or yaw drive system 56, a pitch assembly 66 including one or more pitch drive systems, a gearbox 114, a generator 118, switches like a synchronizing switch 206, a power conversion assembly 210 which may include an electric power main transformer (not shown in FIG. 4), and further subsystems of wind turbine 11 such as, for example, a hydraulic component 92 of a break.

A mechanical system 100 of wind turbine 11 typically includes at least parts of the yaw drive system 56, the pitch assembly 66, the gearbox 114, and the generator 118. Other parts of the yaw drive system 56, the pitch assembly 66, the gearbox 114 and the generator 118 typically form together with the synchronizing switch 206 and the power conversion assembly 210 a part of an electric system of wind turbine 11. The mechanic system and/or the electric system of wind turbine 11 may include all subsystems explained with reference to FIGS. 1 to 3. Accordingly, turbine controller 202 may control all subsystems explained with reference to FIGS. 1 to 3.

As indicated by the arrows in FIG. 4, turbine controller 202 is typically configured to issue commands to the subsystems to change a condition of the respective subsystem and to receive signals from respective sensors about the actual conditions of the subsystems. For sake of clarity, the sensors of the subsystems are not illustrated in FIG. 4.

Furthermore, each subsystem may include several active components. For example, the pitch assembly 66 typically includes a pitch drive systems and a sensor for measuring the pitch angle for each rotor blade.

For controlling wind turbine 11, turbine controller 202 is typically configured to issue setpoint values and/or sequences of setpoints to the subsystems having at least one active component to initiate changing a behavior and/or an operating state of the respective subsystem. The setpoint values may, for example, refer to pitch angles of pitch assembly 66, a yaw angle of yaw drive mechanism 56, a torque or current of generator 118, an active electric power of the power conversion assembly 210, and an reactive electric power of the power conversion assembly 210, to mention only a few.

Furthermore, turbine controller 202 typically receives data about the wind condition from a sensor, for example from an anemometer 59. Anemometer 59 typically measures wind speed and wind direction and transmits these data to turbine controller 202. Alternatively or in addition, an air temperature sensor wind shear, and/or an air density sensor may send their data to turbine controller 202. The turbine controller 202 may be configured to calculate derived values from the received sensor signals such as mean values and higher moments, for example the mean value and the variance of the wind speed. The measured and/or processed sensor signals of external conditions may be used for directly controlling the wind turbine and/or as inputs of the simulation module 300.

In the exemplary embodiment illustrated in FIG. 4, turbine controller 202 is configured to exchange information with a simulator unit 203 of simulation module 300. To ensure independent real time operation of turbine controller 202, simulation module 300 and simulator unit 203, respectively, is typically installed in wind turbine 11 as an independent controller communicating with the turbine controller 202. Typically, simulator unit 203 is used for monitoring a condition of wind turbine 11 and includes a sufficiently powerful processor or processors to simulate the behavior of at least one subsystem of wind turbine 11 in real time or with only minor delays of up to a few seconds, more typically with delays below a second or even below 100 ms. Simulator unit 203 may even be configured to simulate the behavior several subsystems or all subsystems of wind turbine 11 in real time or with only minor delays of up to a few seconds, more typically with delays below a second.

In other embodiments, a computationally sufficiently powerful common control system is operable both as turbine controller 202 and as simulator unit 203. The functions of turbine controller 202 and simulator unit 203, i.e. simulation module 300 and a control module 400, may, for example, be realized as respective threads on a computer of the common control system or on different plug-in-cards of the common control system.

The simulation module 300 and the simulator unit 203, respectively, may, however, also be installed outside wind turbine 11, for example in data processing center which may simulate several wind turbine in parallel.

During operation of wind turbine 11, turbine controller 202 typically forwards the setpoints sent to the subsystems and the signals received from the subsystem and the sensors, respectively, to simulator unit 203. It is however also possible, that at least some of these signals are directly transferred to simulator unit 203. Typically, the setpoints sent to the subsystems and the signals of the subsystem and the sensors form input values of the simulator unit 203.

According to an embodiment, wind turbine 11 further includes sensors 252 for the measuring a temperature inside the nacelle, an acceleration of a subsystem, a position of a subsystem, an orientation of a subsystem, a velocity of a subsystem, a torque of a subsystem, a bending of a subsystem, and/or a load of a subsystem. Typically, wind turbine 11 includes a plurality of sensors 252. For sake of clarity, only one sensor 252 is illustrated in FIG. 4. Typically, the signals of the sensors 252 form also input values of the simulator unit 203.

Furthermore, turbine controller 202 typically includes an internal clock 202*a* to measure an operation time of wind turbine 11. The operation time of wind turbine 11 is typically also forwarded to simulator unit 203 and forms an input value of the simulator unit 203. Alternatively or in addition, simulator unit 203 includes an independent internal clock 302*a*. When both turbine controller 202 and simulator unit 203 include a respective internal clock 202*a*, 302*a*, the two clocks 202*a*, 302*a* are typically synchronized.

Simulation module 300 typically includes for each subsystem of wind turbine 11 to be monitored during wind turbine operation a respective submodule. Typically, subsystem which are susceptible to wear and/or aging such as the yaw drive mechanism 56, a pitch assembly 66, a power conversion assembly 210, a drive system, or parts of the drive system such a gearbox 114, a break, a high speed shaft, a low speed shaft and a generator 118, but also the rotor blades, the wind turbine tower and load-bearing elements in the nacelle are to be monitored during normal operation of the wind turbine. Furthermore, simulator unit 203 typically keeps an up-to-date list of the operating times of each subsystem of wind turbine 11 to be monitored and/or of parts of the subsystem which are particularly exposed to loads. When such a part is exchanged, the up-to-date list is typically updated.

In the exemplary embodiment illustrated in FIG. 4, simulation module 300 includes a yaw drive submodule 567, a pitch system submodule 667, a hydraulic submodule 927, a gearbox submodule 1147, a generator submodule 1187 and a power conversion module 2107. Each submodule 567, 667, 927, 1147, 1187, 2107 is configured to simulate a behavior of the respective subsystem and active component 56, 66, 92, 114, 118, 210, respectively. For this purpose, submodules 567, 667, 927, 1147, 1187, 2107 include a respective model for the subsystem and active component 56, 66, 92, 114, 118, 210, respectively. These models may be analytic or numeric solutions of the corresponding differential equations. Typically approximate analytic or numeric solutions of the corresponding differential equations are used to reduce computation time. It is, however, also possible that at least one of the submodules 567, 667, 927, 1147, 1187, 2107 includes a hierarchy of models of different complexity and accuracy, respectively.

According to an embodiment, simulation module 300 is configured to determine via a respective submodule 567, 667, 927, 1147, 1187, 2107 an expected output signal, for example an expected value or sequence of expected values, of the corresponding subsystem and active component 56, 66, 92, 114, 118, 210, respectively. For this purpose, the setpoint value issued by turbine controller 202 to the corresponding subsystem and active component 56, 66, 92, 114, 118, 210, respectively, may be used as an input of the respective model and submodule 567, 667, 927, 1147, 1187, 2107, respectively.

Furthermore, simulation module 300 is typically configured to compare the expected output signal with an actual output signal of a subsystem. In doing so, a simulated behavior of a subsystem is compared with a measured one. The comparison may be used to detect an unexpected behavior of the subsystem or a drift of the behavior of the subsystem, for example due to wearing and/or an aging process. Typically, simulation module 300 includes a comparator module (not shown in FIG. 4) to compare the expected output signal with the actual output signal.

According to an embodiment, simulation module 300 is further configured to determine, based on the comparison between the expected output signal and the actual output signal of the subsystem, if a further action is to be initiated. When the expected output signal and the actual output signal substantially match, for example when the difference between the expected output signal and the actual output signal lies within a predefined band width, i.e. within given specification limits, no further action is typically to be initiated.

Otherwise, the subsystem is determined not to operate within the given specification. For example, a non-expected or unusual behavior of the subsystem or a high load operation of the subsystem may be detected. According to an embodiment, simulation module 300 is configured to send a message to turbine controller 202 when the subsystem is determined not to operate within the given specification. This information is typically also passed via turbine controller 202 to a SCADA (Supervisory Control and Data Acquisition) system connected with the turbine controller 202, for example as a warning, and may be used to schedule an exchange, repair or maintenance of the submodule.

Depending on the subsystem and the mismatch between expected output signal and the actual output signal, the simulation module 300 may also cause changing a control parameter used by turbine controller 202 to control the respective subsystem and/or the wind turbine 11. For example, the wind turbine may be operated more cautious until an exchange, a repair or maintenance.

According to an embodiment, wind turbine 11 includes at least a subsystem and a simulation module 300. The simulation module 300 is configured to simulate, during normal operation of the wind turbine, a behavior of the at least one subsystem, and to determine, based on the simulated behavior, if the first subsystem operates within given a specification.

According to an embodiment, simulation module 300 includes a sensor submodule 2527 for each sensor 252 to simulate the behavior of the sensors 252. The sensors submodule 2527 may be used to simulate the behavior of wind turbine 11, to validate measurements of the sensor and/or to detect, for example, a drift of the sensor 252 over time.

According to an embodiment, simulation module 300 includes an anemometer submodule 597 to simulate the behavior of the anemometer 59. The anemometer submodule 597 may be used to simulate the behavior of wind turbine 11, to validate measurements of the sensor and/or to detect, for example, a drift of the anemometer 59 over time.

Furthermore, simulation module 300 typically includes a switch submodule 206 for each switch 206 of wind turbine 11. The switch submodule 2067 may, for example, be used to simulate the behavior of wind turbine 11.

According to an embodiment, simulation module 300 includes an aerodynamic submodule 287 to calculate from measured values of the wind condition, measured and/or simulated pitch angle, measured and/or simulated yaw angle as well as measured or simulated rotor speed, a torque and/or a force acting on the low speed shaft, the high speed shaft, the generator, the nacelle and/or the tower of wind turbine 11.

The torque and/or the force determined by aerodynamic submodule 287 is typically used as input for a mechanic submodule 1007. According to an embodiment, mechanic submodule 1007 includes a load module 1017 to calculate a load acting on the mechanical components 100. As indicated by the dashed arrows in FIG. 4, models and/or parameters of the models used in submodules 567, 667, 927, 1147 and/or 1187 may be used to calculate the load acting on the respective submodule. Calculating the load may include calculating forces, mechanical stresses, mechanical stresses mechanical moments, mechanical torques, bendings, deflections, torsions and the like. For example, a moment, a stress, and subsequently resulting deflection and bending angles of a bar, a beam or a carrier for the generator 118 or any other subsystem may be calculated.

According to an embodiment, mechanic submodule 1007 further includes an integrator module 1019 to integrate the load acting on the respective submodule 567, 667, 927, 1147, 1187 and/or to calculate resulting material fatigues and/or to determine remaining expected life times of the subsystems and the wind turbine 11, respectively. For example, only loads which exceed an upper limit of the load specification by, for example, 10% are integrated to calculate resulting material fatigues and/or to determine remaining expected life times.

Likewise, simulation module 300 typically includes an electric submodule (not shown in FIG. 4) for calculating an electric load of the subsystems of the electric system such as power conversion assembly 210 including generator 118.

Furthermore, simulation module 300 typically includes a thermal submodule (not shown in FIG. 4) for calculating the temperature of the subsystems and the wind turbine 11, respectively. Typically, mechanic submodule 1007, electric submodule and thermal submodule are coupled. For example, the calculated electric power loss is typically used as an input for the thermal submodule, and the temperature distribution calculated in the thermal submodule is typically used as input of the mechanic submodule 1007 and the electric submodule.

In doing so, simulation module 300, and thus control system 350 may determine thermal and/or mechanical fatigue loads and/or a remaining expected life time of the subsystems and/or the wind turbine.

Alternatively or in addition, each submodule may include its own load module and integrator module, respectively. This embodiment also allows estimating thermal and/or mechanical fatigue loads and/or remaining expected life times of the subsystems and/or the wind turbine.

Furthermore, control system 350 is typically configured to operate wind turbine 11 such that the variation of mechanical and thermal loads exceed the specification limits at most for short times. In doing so, compliance with design loads may be guaranteed. When the variation of mechanical and thermal loads exceed the specification limits, control system 350 typically issues counteractions, typically by changing of controller settings, i.e. the settings of turbine controller 202a, to meet the predicted system behavior. The controller settings to be changed may be found by knowledge of the system when the influence of parameters and/or the interplay of a combination of several parameters on the behavior are known. Otherwise, the controller settings to be changed may be found by an optimization procedure. In this case, a number of system parameters and their specification limits are typically given and an optimizing submodule (not shown in FIG. 4) calculates new controller settings to meet the required behavior.

When a fatigue load of a subsystem or a part of the subsystem exceeds a given threshold or when the remaining life time of the subsystem or a part of the subsystem falls below a given value, control system 350 typically raises a warning, for example via the SCADA-system. Typically, the given threshold and the given value are chosen such that a maintenance, exchange or repair can be planned with sufficiently long lead time, i.e. weeks, or even months in advance. Advanced planning may facilitate extending maintenance intervals and optimizing maintenance outages. Furthermore, wind turbine availability and reliability may be increased by shifting from time-based to condition-based maintenance. Even further, early warning may facilitate reduction of costs. For example, crane costs may be reduced by identifying problems soon enough to perform some maintenance up-tower.

On the other hand, when the calculated fatigue load is below expected values during design phase and/or when the remaining life time of the subsystem is larger than the difference between the expected life time and the operation time, for example determined from internal clock 202a, the controller settings may be changed such that the averaged power production increases on costs of the loads. For example, the regulation of pitch assembly 66 may be changed such that the operating speed of positioning motors is increased and thus the pitch angles are faster adapted to external wind condition. Accordingly, averaged power production increases. Alternatively, wind turbine 11 may deliver electric power for a longer term than originally planned. In both cases, the totally produced electric power of wind turbine 11 may be increased.

Due to the complexity of the subsystems, analytic solutions describing the behavior of the subsystems reasonably accurate are typically not available. The behavior of the subsystems may be simulated by numerically solving one or a set of respective differential equations.

According to an embodiment, at least some of the subsystems are simulated with transfer functions, which correspond to one or a set of linear differential equations reflecting the behavior of the subsystems. Accordingly, the time for simulation and effort for simulating may significantly be reduced compared to using solvers for the respective differential equations. At least when the subsystems are operated within specification, a reasonable accuracy regarding their input/output behavior is typically obtained with transfer function. To increase accuracy, a subsystem may be subdivided in smaller connected subsystem each of which is simulated by a respective transfer function.

Figure 5:
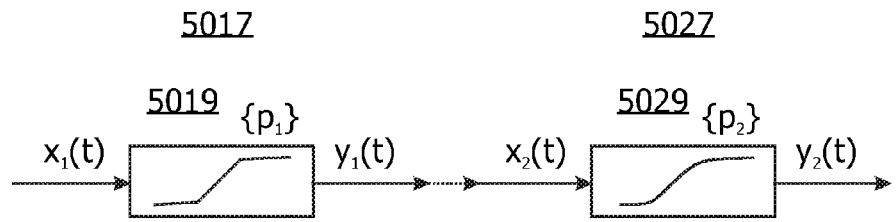
FIG. 5 illustrates a model for simulating one or two subsystems of a wind turbine according to embodiments.

FIG. 5 shows a part of a first submodule 5017 and part of a second submodule 5027 for simulating the behavior of one or two subsystems of a wind turbine according to embodiments. Submodules 5017 and 5027 use respective transfer functions 5019, 5029 to map an input signal $x_1(t)$ and $x_2(t)$, respectively, to an actual output signal $y_1(t)$ and $y_2(t)$, respectively. The input and actual output signals $x_1(t)$, $x_2(t)$, $y_1(t)$, $y_2(t)$ may be real or complex scalars, or real or complex vectorial quantities depending on the subsystem of the wind turbine which is do be described by the submodules 5017 and 5027, respectively. In the following the actual output signal $y_1(t)$ and $y_2(t)$ are also referred to as expected output signal $y_1(t)$ and $y_2(t)$, respectively. Submodules 5017, 5027 may be used for simulating any of the subsystems described with reference to FIGS. 1 to 4.

Furthermore, the input and output signals $x_1(t)$, $x_2(t)$, $y_1(t)$, $y_2(t)$ typically depend on time t. It is however also possible that the input signals $x_1(t)$, $x_2(t)$ are or include time independent quantities, in particular when the subsystem includes or is an active component to which a setpoint typically forming an input parameter of the subsystem may be issued by the turbine controller to change a state and/or a behavior of the subsystem. For example, submodule 5017 may be used to simulate the behavior of a wind turbines pitch system or a pitch drive. The input signals $x_1(t)$ may, for example, be given by the turbine controller as a requested time dependent pitch angle or as a time-independent pitch rate. In both examples, a simulated time dependent pitch angle $y_1(t)$ is calculated by submodule 5017.

Further, a measured and/or simulated external condition of the wind turbine such as wind speed, a wind speed profile, an air temperature, an air moisture may form an input parameter and a part of the input signal, respectively, of a submodule. Furthermore, an internal condition of the wind turbine such as a measured or calculated temperature of the subsystem or a measured or calculated mechanical state, for example an oscillation or bending, of a further subsystem which is mechanically coupled with the subsystem may form an input parameter and a part of the input signal, respectively, of the submodule.

Typically, the transfer functions used herein are a mathematical representation of the relation between a corresponding input signal and actual output signal of a wind turbine subsystem simulated a linear time-invariant system. A transfer function may be described in terms of spatial or temporal frequencies obtained from a cross power spectral densities of a reference input signal and a reference actual output signal and the power spectral density of the reference input signal. The reference input signals and the reference output signals may be determined during initial measurement campaigns.

The transfer functions may also be described by parameters such as eigenfrequency, damping constant, gain factor, phase shift and/or delay of transfer function types representing a linear differential equation or a system of linear differential equations. This is indicated in FIG. 5 for the transfer functions 5019, 5029 by the parameter sets $\{p_1\}$ and $\{p_2\}$, respectively.

Furthermore, the transfer function may be represented by lookup tables and/or appropriate interpolation routines. The dimension of the lookup tables typically depend on accuracy and dimension of the parameter set.

As indicated by the dashed arrow in FIG. 5, the output signal $y_1(t)$ obtained by mapping the input signal $x_1(t)$ with the transfer function 5019 of the first submodule 5017 may be used as input signal of the second submodule 5027. In doing so, a behavior of larger subsystem formed by two connected subsystem of the wind turbine may be model. According to an embodiment, the main parts of the wind turbine including the tower, the nacelle and its components like the drivetrain and the converter system or even a complete wind turbine are simulated normal operation of the wind turbine.

Figure 6:
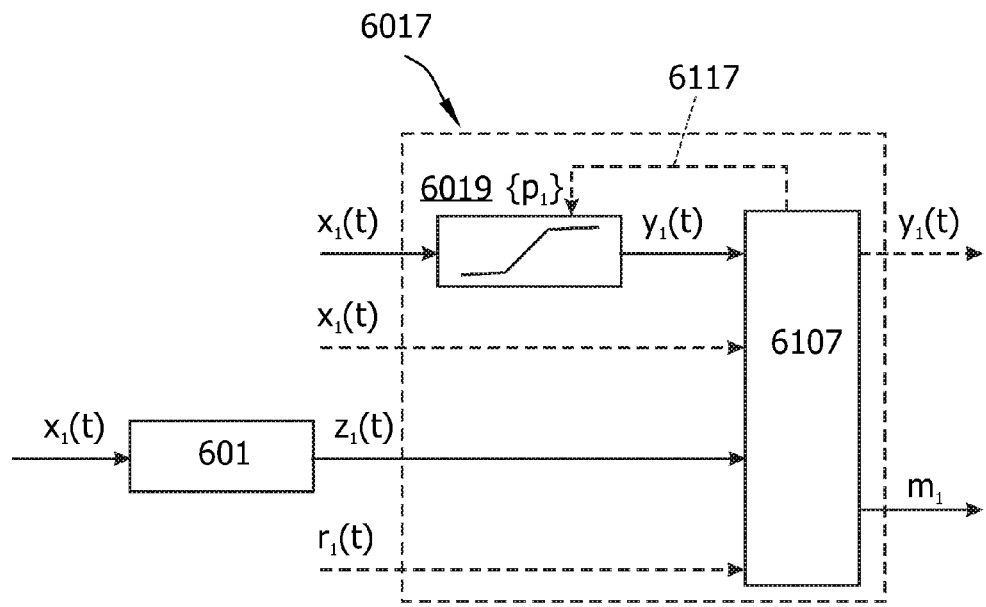
FIG. 6 illustrates a submodule for simulating a subsystem of a wind turbine according to an embodiment.

FIG. 6 shows a submodule 6017 for simulating a behavior and/or a condition of a subsystem 601 of a wind turbine according to embodiments. An input signal $x_1(t)$ is fed to subsystem 601 of the wind turbine. In parallel, the input signal $x_1(t)$ is also transferred to and used as an input of a corresponding submodule 6017 of a simulation module of the wind turbine. Similar as explained with reference to FIG. 5, submodule 6017 uses a transfer function 6019 to map the input signal $x_1(t)$ to an output signal $y_1(t)$ which forms an expected output signal for behavior of subsystem 601.

In parallel, an actual output signal $z_1(t)$ of subsystem 601 is determined, typically by a sensor of subsystem 601 and the wind turbine, respectively. The actual output signal $z_1(t)$ of subsystem 601 is also used as an input of submodule 6017.

According to an embodiment, subsystem 601 includes an evaluating module 6107 to determine if the first subsystem operates as expected, for example, within given specifications. For this purpose, evaluating module 6107 typically compares the actual output signal $z_1(t)$ of subsystem 601 with the expected output signal $y_1(t)$. When the actual output signal $z_1(t)$ of subsystem 601 and the expected output signal $y_1(t)$ substantially match, the first subsystem is assumed to operate within its specifications. However, when a difference or distance between the actual output signal $z_1(t)$ of subsystem 601 and the expected output signal $y_1(t)$ lies outside a given range, subsystem 601 may operate outside its specification. Accordingly, a corresponding message, warning or command $m_1$ is typically send by evaluating module 6107, for example, to the turbine controller of the wind turbine. In response, the turbine controller may change the control parameters of the wind turbine to avoid a longer lasting operation of subsystem 601 outside its specification. Accordingly, higher loads of subsystem 601 may be avoided and thus the life time of subsystem 601 increased.

The difference between the actual output signal $z_1(t)$ of subsystem 601 and the expected output signal $y_1(t)$ may be determined differently. According to an embodiment, the difference between the actual output signal $z_1(t)$ of subsystem 601 and the expected output signal $y_1(t)$ is determined in the signal space. For example, the actual output signal $z_1(t)$ of subsystem 601 and the expected output signal $y_1(t)$ may be a sequences of values at discrete times, and the difference between the two signals $y_1(t)$, $z_1(t)$ may be determined as the absolute value of a maximum or an average difference between the signals $y_1(t)$, $z_1(t)$ at corresponding times.

According to an embodiment, the difference between the actual output signal $z_1(t)$ of subsystem 601 and the expected output signal $y_1(t)$ is determined as a distance in the space of the transfer function 6019. For this purpose, evaluating module 6107 typically also receives the input signal $x_1(t)$ and is configured to later send the input signal $x_1(t)$ as inputs to the transfer function 6019 and to modify the transfer function 6019, for example the parameters $\{p_1\}$ of the transfer function 6019. This is indicated by the dashed arrow 6117. With appropriate algorithms, a transfer function estimator may be implemented. New parameters of the transfer function 6019 or a new transfer function 6019 may be determined by the transfer function estimator of evaluating module 6107 so that the actual output signal $z_1(t)$ of subsystem 601 substantially matches the expected output signal $y_17(t)$ obtained by mapping the input signal $x_1(t)$ with the new transfer function 6019 or the transfer function 6019 with the new parameters, respectively. In this embodiment, the difference between the actual output signal $z_1(t)$ of subsystem 601 and the expected output signal $y_1(t)$ is typically determined as a distance in the transfer functions space. For example the differences between the parameters of the transfer functions may be used as a measure for the difference between the actual output signal $z_1(t)$ of subsystem 601 and the expected output signal $y_1(t)$.

Typically, the difference between the actual output signal $z_1(t)$ of subsystem 601 and the expected output signal $y_1(t)$ is tracked by the evaluating module 6107. In doing so, a drift of the behavior of subsystem 601 may be monitored. This may be used to monitor an aging process and/or to facilitate planning a maintenance, repair or exchange of subsystem 601.

In addition, submodule 6017 may be configured to send the expected output signal $y_1(t)$ to other submodules, and to receive expected output signal of other submodules and/or other signals $r_1(t)$ required for calculation. Other signals $r_1(t)$ may include sensor data, for example temperatures or wind conditions, which may influence the behavior of subsystem 601 and may be taken into account for simulating the behavior of subsystem 601 in submodule 6017.

Furthermore, evaluating module 6107 may include a load module (not shown in FIG. 6). The load module is typically used to determine an expected load of subsystem 601, for example a mechanical load and/or a thermal load. This enables a comparison of the expected loads with a load specification or design load of subsystem 601, and thus to determine a remaining life time of subsystem 601. Accordingly, a maintenance, repair or exchange of subsystem 601 may be scheduled early enough.

Figure 7:
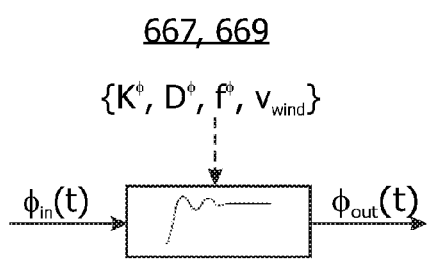
FIG. 7 illustrates a submodule for simulating a pitch system of a wind turbine according to an embodiment.

FIG. 7 shows a part of submodule 667 to simulate a pitch system of a wind turbine during normal operation according to an embodiment. The complete submodule 667 is typically similar to the submodule illustrated with respect to FIG. 6, but includes a transfer function 669 instead of the transfer function 6019. By mapping a requested pitch angle $\phi_{in}(t)$ as input signal to an expected pitch angle $\phi_{out}(t)$ with transfer function 669, the input-output behavior of a wind turbine pitch system may be simulated.

In the exemplary embodiment illustrated in FIG. 7, submodule 667 is configured to determine an eigenfrequency $f^\Phi$, a damping constant $D^\Phi$ and a gain factor $K^\Phi$ of the pitch system. The eigenfrequency $f^\Phi$, the damping constant $D^\Phi$ and the gain factor $K^\Phi$ form the parameters of the transfer function 669 modeling the pitch system as $2^{nd}$ order delay element. The parameters $f^\Phi$, $D^\Phi$ and $K^\Phi$ are typically determined by a transfer function estimator of submodule 667, similar as explained with reference to FIG. 5. The transfer function estimator of submodule 667 also receives a corresponding actual output signal of the pitch system, typically a measured resulting pitch angle as function of time and determines new parameters $f^{\Phi 7}$, $D^{\Phi 7}$ and $K^{\Phi 7}$ so that the actual output signal of the pitch system and the expected output signal substantially match. Typically, the deviation of the operating characteristics of the pitch system is measured as a distance d in the corresponding function space, for example as a Euclidean distance d of the parameters $d=(\alpha^*(f^{\Phi 7}-f^\Phi)^2+\beta^*(D^{\Phi 7}-D^\Phi)^2+\gamma^*(K^{\Phi 7}-K^\Phi)^2)^{0.5}$ with positive weights $\alpha$, $\beta$, $\gamma$. In doing so, a deviation of the operating characteristics of the pitch system may be quantified and counteractions may be issued to avoid heavy loads of the pitch system. Furthermore, a drift of the parameters $f^\Phi$, $D^\Phi$ and $K^\Phi$ is typically tracked so that a repair or maintenance of the pitch system may be scheduled early enough. The initial transfer function used after commissioning the wind turbine may be calculated one or may be determined in a test phase prior to handing over and/or switching the wind turbine to the grid.

Alternatively or in addition, the actual output signal of the pitch system may be directly compared with the expected pitch angle $\phi_{out}(t)$ to determining a distance between the two signals, for example as a root mean square distance $d_{rms}$ between of the two signals. When the root mean square distance $d_{rms}$ is larger than a given value counteractions may be issued to avoid heavy loads of the pitch system. Further, monitoring a drift of the root mean square distance $d_{rms}$ over time may be used to schedule a repair or maintenance of the pitch system.

As the calculation of the root mean square distance $d_{rms}$ is typically faster than determining a new transfer function, the latter may only be done when the root mean square distance $d_{rms}$ is larger than a given threshold. Accordingly, computational time may be saved.

According to an embodiment, an external condition of the wind turbine is taken into account to simulate the input-output behavior of the pitch system. For example, a wind speed $v_{wind}$ measured by an anemometer may be used as a further input. In the simplest case, two different transfer functions are, depending on the wind speed $v_{wind}$, used, one for low winds and another for high winds. Accordingly, the accuracy of the simulation may be increased.

Furthermore, internal parameters such as a measured or calculated internal temperature of the nacelle may be taken into account when the behavior of the pitch system is simulated by transfer functions. Accordingly, the accuracy of the simulation may be increased.

Even further, measured or simulated parameters determined of subsystems, for example of the blade, may be taken into account when the behavior of the pitch system is simulated by transfer functions. For example, effect of a gust on the pitch system via the blades may be taken into account. Accordingly, the accuracy of the simulation may be increased.

Figure 8:
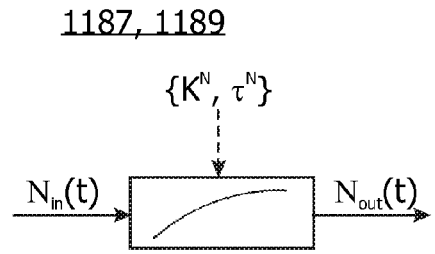
FIG. 8 illustrates a submodule for simulating a generator system of a wind turbine according to an embodiment.

FIG. 8 shows a part of submodule 1187 to simulate a generator system of a wind turbine during normal operation according to an embodiment. The complete submodule 1187 is typically similar to the submodule illustrated with respect to FIG. 6, but includes a transfer function 1189 instead of the transfer function 6019. By mapping a requested torque $N_{in}(t)$ as input signal to an expected torque $N_{out}(t)$ with transfer function 669, the input-output behavior of the generator system may be simulated.

In the exemplary embodiment illustrated in FIG. 8, submodule 1187 is configured to determine a time constant $\tau^N$ and a gain factor $K^N$ of the generator system. The time constant $\tau^N$ and the gain factor $K^N$ form the parameters of the transfer function 1189 modeling the pitch system as first order delay element.

Similar as explained with reference to FIG. 7 for the simulation of the pitch system, the time constant $\tau^N$ and the gain factor $K^N$ are typically determined by a transfer function estimator of submodule 1187. Any deviation of the operating characteristics of the generator system may be determined in terms of a distance between the stored transfer function and a newly determined transfer function that reproduces a measured input-output behavior of the generator system. Accordingly, counteractions may be issued to avoid heavy loads of the generator system, and/or a repair or maintenance of the generator system may be scheduled early enough.

Furthermore, measured or simulated parameters determined for other subsystems such as a measured or calculated internal temperature of the nacelle and the generator system, respectively, may be taken into account for simulating the behavior of the generator system by transfer functions. Accordingly, the accuracy of the simulation may be increased.

With respect to FIGS. 7 and 8, exemplary submodules for simulating the pitch system and the generator system, respectively, are explained. However, other subsystems may be simulated in parallel as well. For example, the motion of the tower may be measured, for example with an acceleration sensor, and the response of the tower to a changing wind condition may be simulated. The expected output signal of the simulation is than typically compared with the actual output signal provided by the sensors. Accordingly, a change of the eigenfrequency and/or a change of the damping constant of the tower may be detected and evaluated. Thus, a maintenance may be scheduled in time.

Typically, all main parts of the wind turbine including the tower, the nacelle and its components like the drivetrain and the converter system are simulated during normal operation of the wind turbine. Even a complete wind turbine may be simulated using transfer functions of suitably interrelated respective submodules. This allows monitoring of the behavior of the main subsystems of or even all subsystems of the wind turbine during normal operation. Accordingly, maintenance of the subsystems may be coordinated as required. Thus, the down time of the wind turbine may be reduced. Furthermore, the operation of the wind turbine may be adapted to simulated loads and thus the life time of the wind turbine and the wind turbines subsystems, respectively, used. This will become more apparent from the following description of methods for monitoring wind turbines.

Figure 9:
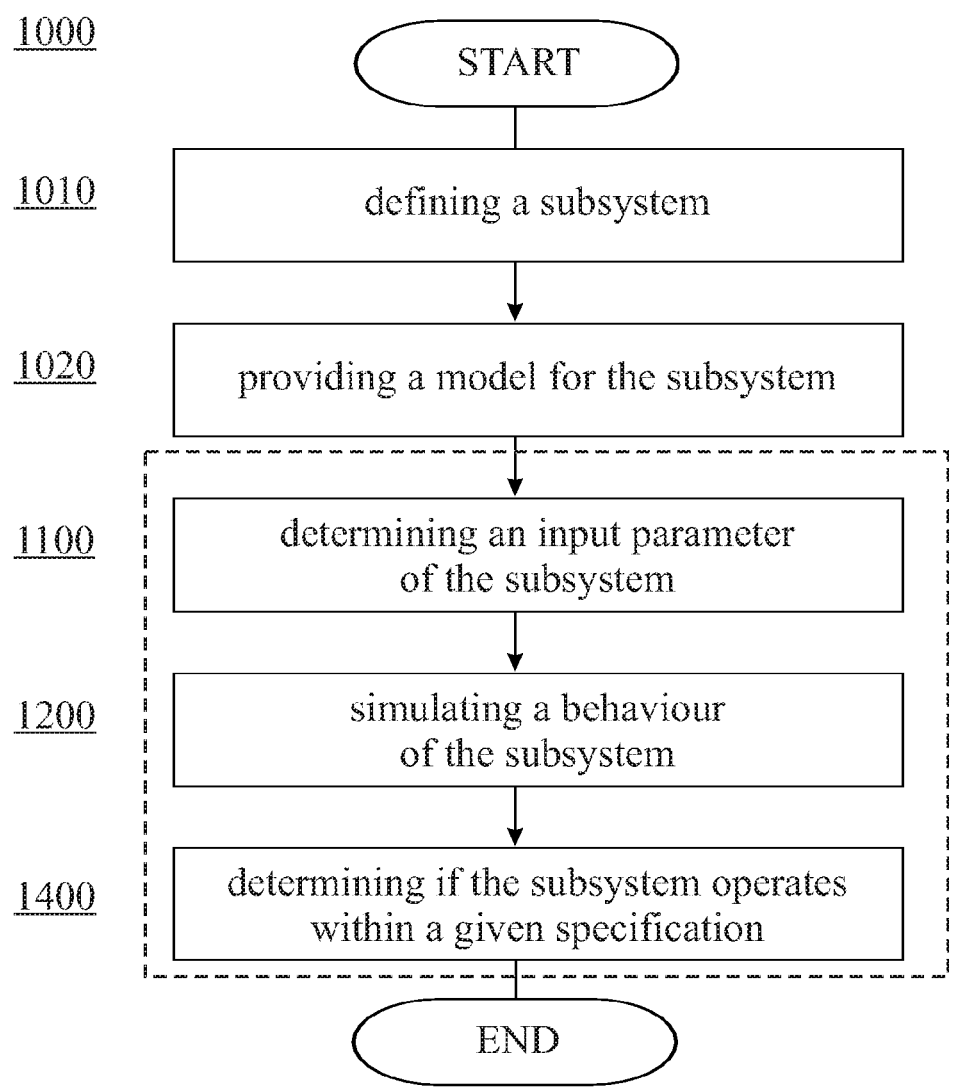
FIG. 9 illustrates a flow diagram of a method for monitoring a wind turbine according to an embodiment.

FIG. 9 shows a flow diagram of a method 1000 for monitoring a wind turbine according to an embodiment. In a first block 1010 a subsystem to be monitored during normal operation of a wind turbine is determined. Typically, several subsystems of the wind turbine are defined in block 1010. For example, a pitch system, a yaw system, a generator system, a power conversion system, and/or a transformer system may be defined in block 1010. The wind turbine may even be subdivided in a complete set of subsystem to be monitored during normal operation of a wind turbine in block 1010.

In a subsequent block 1020, a simulation model is provided for each of the subsystems defined in block 1010. For example, a simulation model for the pitch system, the yaw system, the generator system, the power conversion system, the transformer system, and/or parts thereof may be provided in block 1020. Typically, providing the simulation models includes determining appropriate transfer functions describing the input-output behavior of the respective subsystems including determining parameters such as gain factor, damping factors, eigenfrequency and the like. Typically, the simulation models are realized as submodules of a simulation module which is configured to communicate with a wind turbine control module. Furthermore, individual transfer functions and parameters, respectively, may be determined for each wind turbine of a wind farm. This is typically done prior to commissioning the wind turbines. Accordingly, the wind turbines are typically equipped with individual pre-defined transfer function prior to switching them to a grid.

Thereafter, several blocks are typically carried out during normal operation of the wind turbine as indicated by the dashed rectangle. In a block 1100, an input parameter of the subsystem defined in block 1010 is determined Determining the input parameter may include measuring an external condition of the wind turbine, for example a wind speed.

When the subsystem includes an active component, determining the input parameter may include determining a setpoint of the active component or an input signal of the active component by the turbine controller. For example, the turbine controller may determine a pitch rate or a time dependent pitch angle for a pitch system. The pitch rate or the time dependent pitch angle is than typically issued to the pitch system and also transferred to a pitch system submodule and the simulation module, respectively.

Thereafter, the behavior of the subsystem is simulated in a block 1200 taking the input parameter into account. For example, the input value may be mapped by a transfer function to an expected output value and an expected output signal of the submodule, respectively.

In a block 1400, it is determined from the simulated behavior if the subsystem operates within given specifications. Method 1000 may be used to detect an operational behavior of the subsystem which is beyond its specification. Method 1000 may, therefore, form the basis of appropriate counteractions.

According to an embodiment, simulating the behavior in block 1100 includes determining a load of subsystem, for example a mechanical, a thermal and/or an electric load of the subsystem. In this embodiment, estimating in block 1400 typically includes determining if the load exceeds a design load of the subsystem. This may be used to change the controlling of the wind turbine to avoid operating the subsystem at to high loads over a longer time.

Calculating the load may include calculating forces, mechanical stresses, mechanical stresses mechanical moments, mechanical torques, bendings, deflections, torsions and the like. For example, a moment, a stress, and subsequently resulting deflection and bending angles of a bar, a beam or a carrier for the generator, the tower or any other subsystem may be calculated.

Furthermore, calculating the load may take into account sensor data such as a temperature sensor, a wind vane, an anemometer, an acceleration sensor, a position sensor, an orientation sensor, a velocity sensor, a torque sensor, a bending sensor, or a load sensor to increase accuracy and/or to reduce computing demands.

Furthermore, block 1200 may include determining an expected output signal of the at least one subsystem. In this embodiment, method 1000 typically further includes a process of measuring an actual output signal of the subsystem. Accordingly, estimating if the subsystem operates within the given specification typically includes determining a distance between the actual output signal and the expected output signal.

Typically, the blocks 1100 to 1400 are carried out in real time during normal operation of the wind turbine. Furthermore, the blocks 1100 to 1400 are typically carried out for several subsystems or even all subsystems of the wind turbine in real time during normal operation of the wind turbine. Accordingly, the loads of several or even all subsystems may be evaluated based on a simulation during normal operation of the wind turbine.

Figure 10:
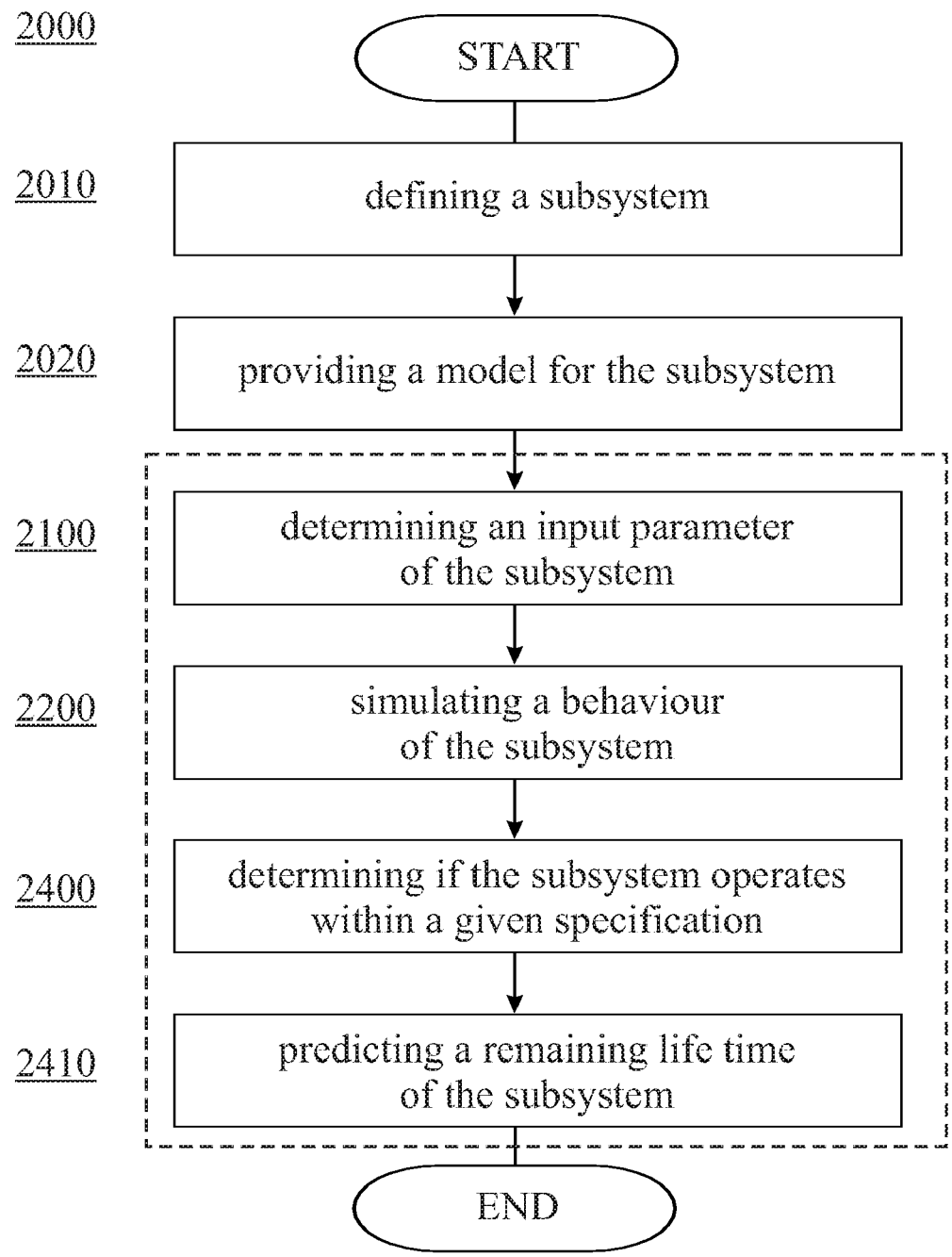
FIG. 10 illustrates a flow diagram of a method for monitoring a wind turbine according to an embodiment another embodiment.

FIG. 10 shows a flow diagram of a method 2000 for monitoring a wind turbine according to an embodiment. Method 2000 is similar to method 1000 but includes an additional block. In blocks 2010 and 2020 a subsystem to be monitored during normal operation of a wind turbine is determined and a simulation model is provided for the subsystem, respectively.

Thereafter, in blocks 2100, 2200 and 2400, at least an input parameter is determined, a behavior of the subsystem is simulated taking the at least an input parameter into account, and it is determined if the subsystem operates within given specification.

According to an embodiment, a remaining life time of the subsystem is predicted in a block 2410. For example, if the loads exceeds more than about 10% the rated load, a remaining life time of the subsystem is reduced depending on the time the overload takes effect.

Typically, a list of remaining expected life times of all submodules to be monitored is updated in block 2410. Accordingly, the expected life times of the submodules are known at any time during normal operation of the wind turbine and a maintenance or repair may be scheduled in time and even coordinated with a maintenance or a repair of other wind turbines of a wind farm. Accordingly, maintenance costs may be reduced.

Figure 11:
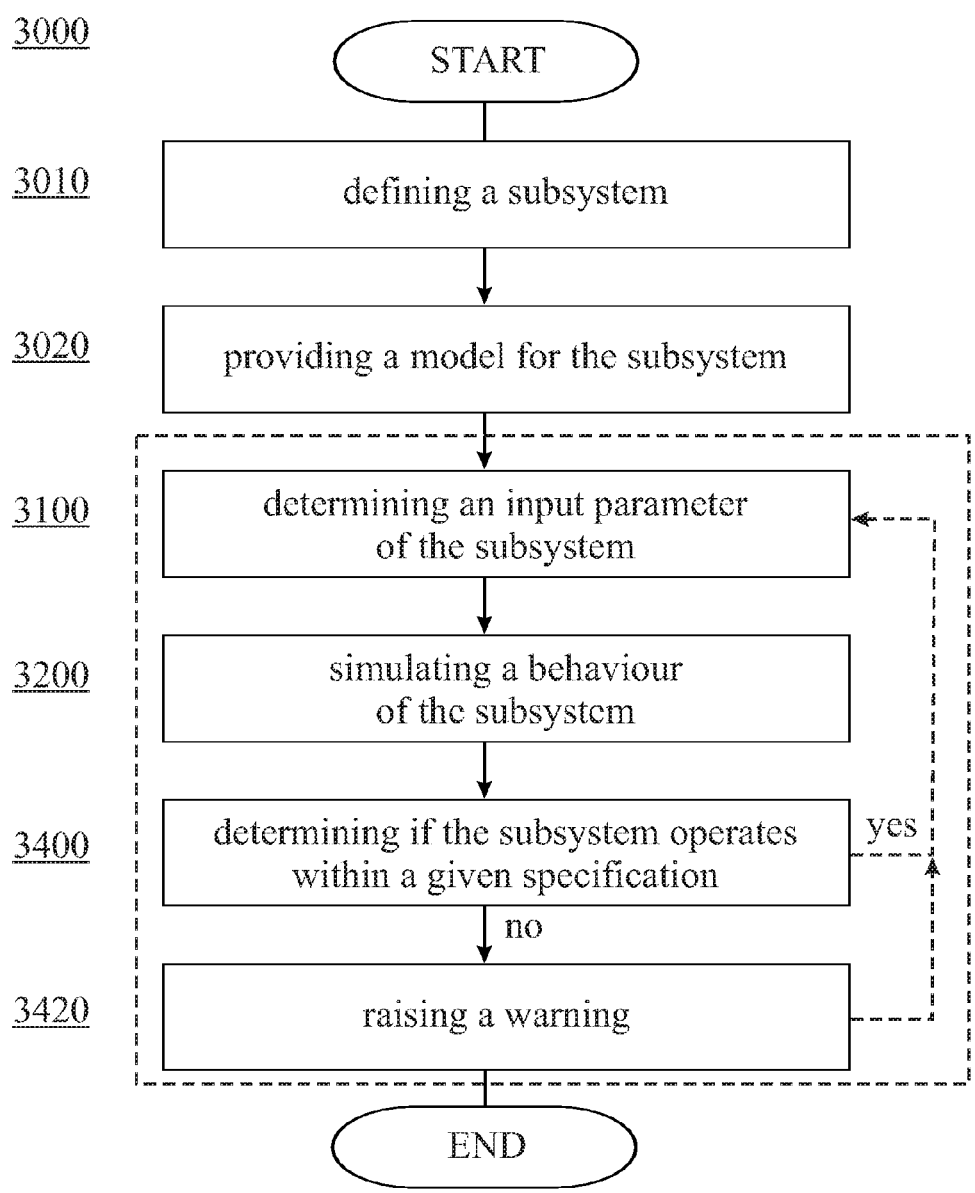
FIG. 11 illustrates a flow diagram of a method for monitoring a wind turbine according to yet another embodiment.

FIG. 11 shows a flow diagram of a method 3000 for monitoring a wind turbine according to an embodiment. Method 3000 is similar to method 1000 but includes an additional block. In blocks 3010 and 3020 at least one subsystem, typically a plurality of subsystems, to be monitored during normal operation of a wind turbine is determined and a simulation model is provided for the at least one subsystem, respectively. Defining the at least one subsystem of the wind turbine may, for example, include defining a pitch system, a yaw system, a generator system, a power conversion system, a transformer system, or a part thereof.

In blocks 3100, 3200 and 3400, at least an input parameter is determined, a behavior of the subsystem is simulated taking the at least an input parameter into account, typically as an input of the simulation model, and it is determined if the subsystem operates within given specification.

If the subsystem is determined to be in accordance with the given specification in block 3400, method 3000 may return to block 3100. This is indicated by the dashed arrow in FIG. 11. Otherwise, a warning is typically raised, and, for example, send to the turbine controller of the wind turbine. Thereafter, a control parameter of the turbine controller may be changed and/or a maintenance of the subsystem may be scheduled. Subsequently, method 3000 may return to block 3100, as indicated by the dashed arrow. If the subsystem is not operating within a given specification, a warning is raised 3420 and the method 3000 may return to block 3100 as indicated by the dashed arrow or end.

Figure 12:
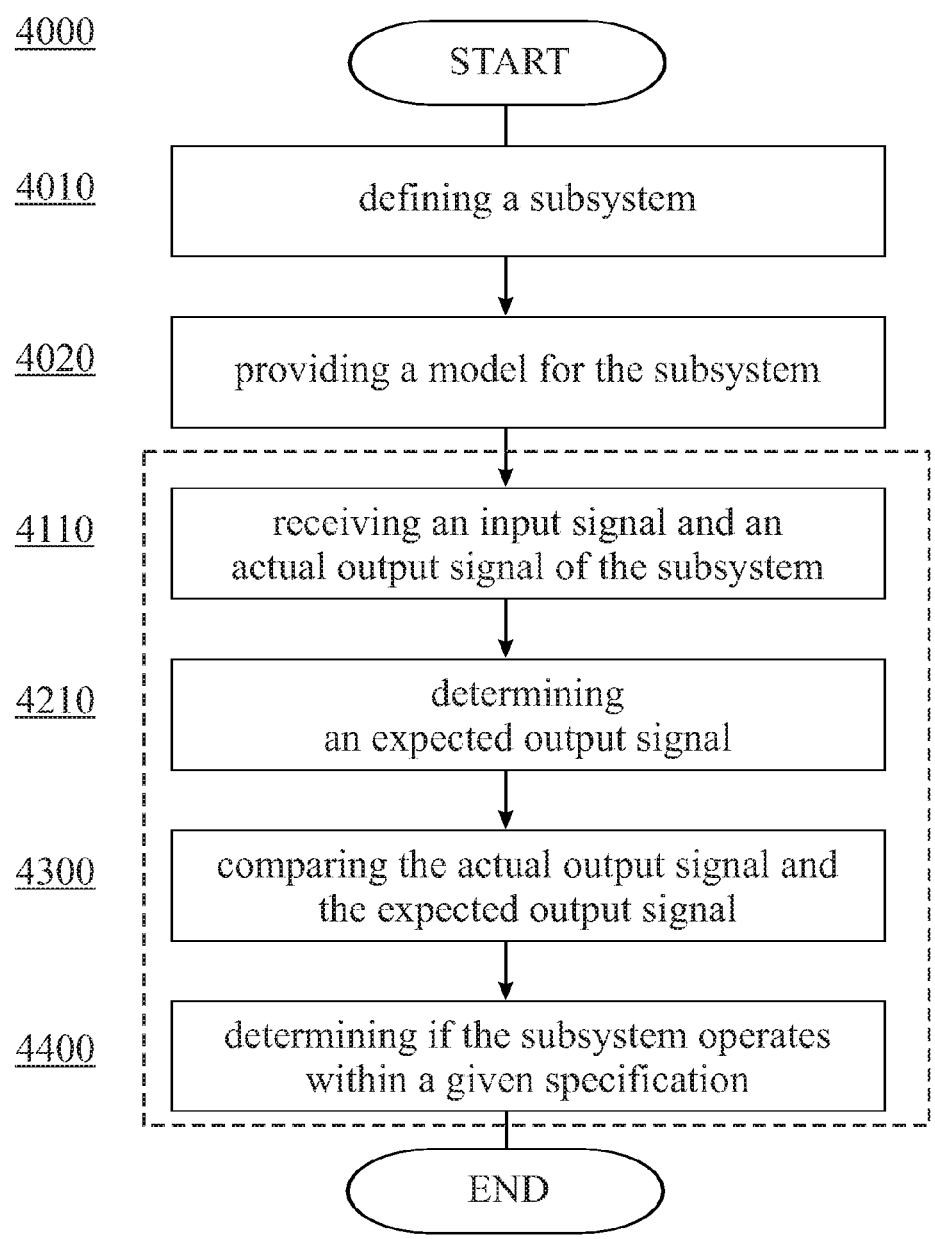
FIG. 12 illustrates a flow diagram of a method for monitoring a wind turbine according to still another embodiment.

FIG. 12 shows a flow diagram of a method 4000 for monitoring a wind turbine according to an embodiment. In a first block 4010, a subsystem to be monitored during normal operation of a wind turbine is determined. Thereafter, a simulation model is provided for the subsystem in block 4020. Typically, a plurality of subsystems or even a set of subsystem representing a complete wind turbine may be defined in block 4010. Accordingly, a respective set of submodules with respective simulation models is typically provided in block 4020.

In a block 4110, an input signal and a corresponding actual output signal of the subsystem are received during normal operation of the wind turbine. The output signal is typically provided by a sensor measuring a response of the subsystem to the input signal, for example a new setpoint sent by the turbine controller to the subsystem.

Thereafter, an expected output signal of the subsystem is determined using the input signal as an input of the simulation model in a block 4210. For example, the input signal is mapped to the expected output signal using the model, typically using a transfer function, in the block 4210.

Thereafter, the actual output signal and the expected output signal are compared in a block 4300. Typically, a distance between the actual output signal and the expected output signal is determined in a block 4300. As explained with reference to FIG. 6, the distance may be determined as difference in the space of the output signals or, when transfer functions are used to simulate the input-output behavior of the subsystem, in a space of the transfer functions.

In a block 4400, it is determined, on the basis of the distance, if the subsystem operates within given specifications. For example, when the distance is smaller than a predefined value, the subsystem is assumed to operate within its specification. Method 4000 may also be used to detect an operational behavior of the subsystem which is beyond its specification and may, therefore, form the basis of appropriate counteractions.

Figure 13:
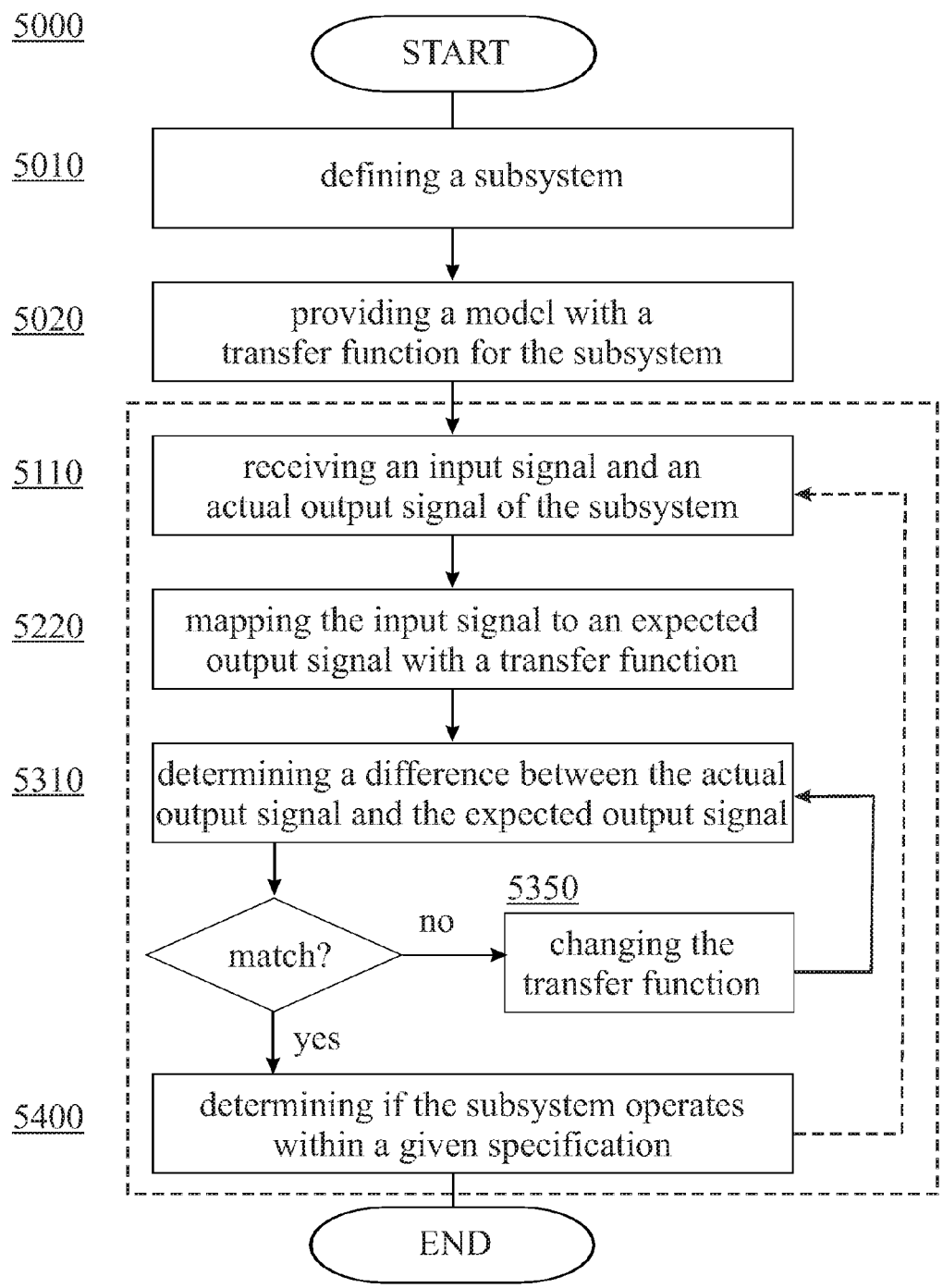
FIG. 13 illustrates a flow diagram of a method for monitoring a wind turbine according to another embodiment.

FIG. 13 shows a flow diagram of a method 5000 for monitoring a wind turbine according to an embodiment. Method 5000 is similar to method 4000 but includes additional blocks. In a block 5010, a subsystem of a wind turbine is defined. Further, a simulation model with a transfer function describing an input-output relation of the subsystem is provided in a block 5020. In a block 5110, an input signal and a corresponding actual output signal of the subsystem are received during normal operation of the wind turbine. The input signal is mapped by the transfer function of the model to an expected output signal in a block 5220 to determine the expected output signal.

Thereafter, a difference between the actual output signal and the expected output signal is determined in a step 5310. Determining the distance between the two transfer function may include determining the difference between the respective parameter values of the two transfer function. For example, a difference of an eigenfrequency, a damping constant, a gain factor, a phase shift, a delay, or a combination thereof may be used to determine the distance between the two transfer function.

When the actual output signal and the expected output signal substantially match, i.e. when the difference between the actual output signal and the expected output signal is smaller than a given threshold, it is determined in a block 5400 if the subsystem operates within given specifications. Thereafter, method 5000 may return to block 5110 as indicated by the dashed arrow.

When the actual output signal and the expected output signal deviate from each other, i.e. when the difference between the actual output signal and the expected output signal is equal or larger than the given threshold, the transfer function is changed in a block 5350 prior to returning to block 5310. Changing the transfer function may include changing parameter values of the transfer function. Changing the transfer function may, however, also include replacing the transfer function by the different transfer function. This loop is carried out until the actual output signal and the expected output signal substantially match. If the number of iterations becomes too large, a warning is typically raised indicating that the system is not operating according to its specification.

When the transfer function is not changed in method 5000, the subsystem is typically determined to operate within the given specifications. Otherwise, a distance between the transfer function with which method 5000 has started and the changed transfer function is determined in block 5400. Depending on the distance between the two transfer function, it is determined if the subsystem operates within its specifications. Furthermore, the distance between the two transfer function may be used to estimate how far the subsystem operates outside its specification.

Further, the change of the transfer function is typically tracked. This information may be used to detect a drift of the behavior of the subsystem and/or to schedule a maintenance.

Figure 14:
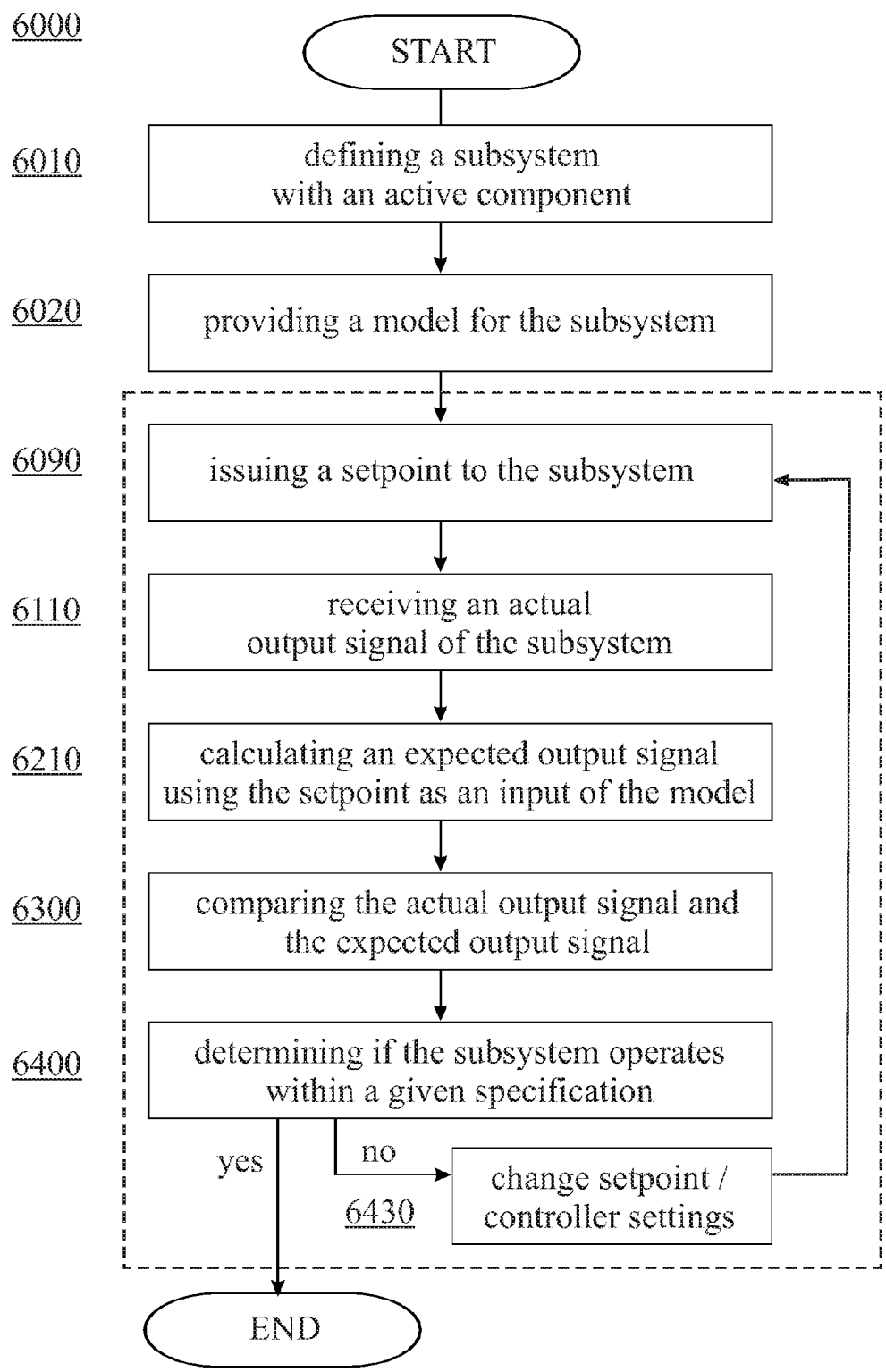
FIG. 14 illustrates a flow diagram of a method for monitoring a wind turbine according to yet another embodiment.

FIG. 14 shows a flow diagram of a method 6000 for monitoring a wind turbine according to an embodiment. Method 6000 is similar to method 4000 but includes additional blocks. In a subsequent block 6010, a subsystem with an active component of a wind turbine is defined. Further, a simulation model, typically a simulation model based on a transfer function, describing the subsystem is provided in a block 6020. In a block 6090 the turbine controller issues a setpoint to the subsystem and transfers the setpoint to the corresponding submodule. In a block 6110, a corresponding actual output signal of the subsystem is received during normal operation of the wind turbine. Thereafter, an expected output signal is calculated using the setpoint as an input of the model in a block 6210. Thereafter, the actual output signal and the expected output signal are compared in a block 6300. Depending on the comparison, it is in a subsequent block 6400 determined if the subsystem operates within a given specification. If so, method 6000 may stop or return to block 6090. Otherwise, a message is sent to the turbine controller, and it is determined if the setpoint is to be changed to avoid longer lasting operation of the subsystem outside its specification in a block 6430. Furthermore, a controller setting of the turbine controller may be changed in order to avoid that the subsystem operates outside its specification in the future.

Figure 15:
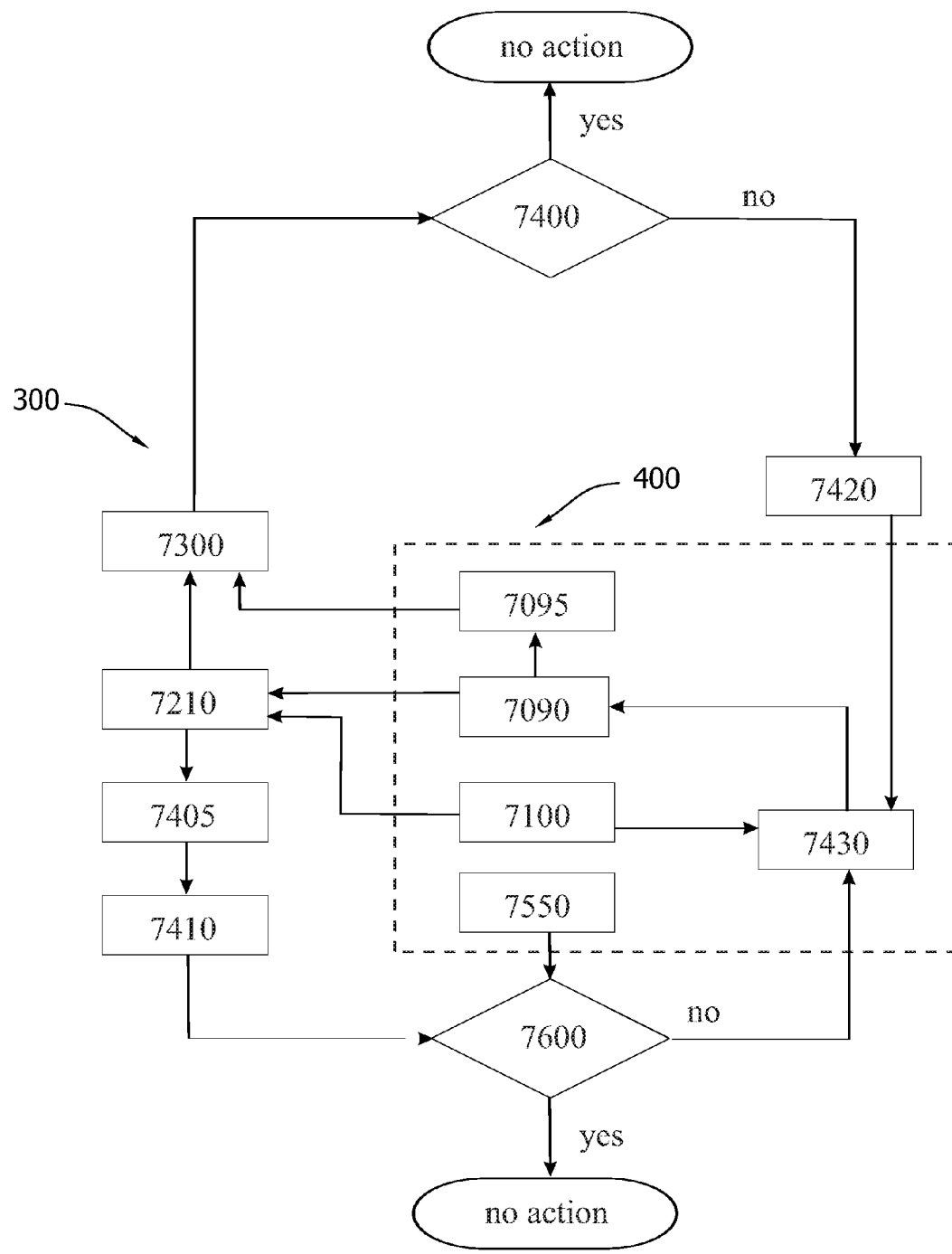
FIG. 15 illustrates a flow diagram of a method for monitoring a wind turbine according to another embodiment.

FIG. 15 shows a flow diagram of a method 7000 for monitoring a wind turbine according to yet another embodiment. Method 7000 is typically performed by a control system of the wind turbine. The control system includes a control module 400 and a monitoring system having a simulation module 300. The blocks inside the dashed rectangle are typically performed by the control module 400 and the turbine controller operating as control module 400, respectively. The blocks outside the dashed rectangle are typically performed by the simulation module 300. The simulation module 300 may be realized by a separate controller communicating with the turbine controller. Typically, the simulation module includes for several subsystems of the wind turbine, for example all subsystems of the wind turbine, respective submodules with appropriate simulation models. For sake of clarity, method 7000 is explained only with respect to one subsystem having an active component.

When a new setpoint is issued from the turbine controller to the subsystem in a block 7090, a sensor of the subsystem measures a corresponding actual output signal of the subsystem in a block 7095. The actual output signal is transferred to the simulation module 300 which compares the actual output signal with an expected output signal in a block 7300. For this purpose the expected output signal is calculated in a block 7210 using the setpoint as an input of the model. Further, external conditions such as the wind speed, air temperature, and air moisture are typically periodically measured in a block 7100. The external conditions are typically also used as inputs of the simulation model in block 7210.

In a block 7400 it is determining if the subsystem operates within a given specification. If so, no further action is typically required. Otherwise, a warning is raised in a block 7420 and a corresponding message is sent to the turbine controller. The warning may also be forwarded to a SCADA system (not shown in FIG. 15) of the wind turbine.

In response to the message, the turbine controller determines in a block 7430 if the setpoint is to be changed to avoid longer lasting operation of the subsystem outside its specification. For this decision, the turbine controller typically takes into account the external conditions measured in block 7100. Accordingly, the parameter of the turbine controller may be modified during normal operation so that the subsystem is operated in compliance with assumptions of design.

In parallel, a load, for example a fatigue load, is typically calculated in a block 7405. Calculating the load typically may takes into account the behavior simulated in block 7210. Depending on the calculated load, an expected remaining life time of the subsystem is determined in a block 7410.

The expected remaining life time is typically compared with a measured remaining life time of the subsystem since commission in a block 7600. The measured life time of the subsystem may be determined from a clock in a block 7550.

When the expected remaining life time and the measured remaining life time substantially matches, no further action is typically required. Otherwise, a message is sent to the turbine controller. In response to the message, the turbine controller determines in block 7430 if the controller parameters are to be changed. For example, the subsystem may be controlled more aggressively when the predicted remaining life time is higher than the measured remaining life time. Accordingly, the energy output of the wind turbine may be increased. Typically, the subsystem is controlled less aggressively when the predicted remaining life time is lower than the measured remaining life time to ensure life time of the subsystem. Accordingly, the parameters of the turbine controller maybe adjust normal operation of the wind turbine. Further, possible margins of the live time of the subsystems may fully be used.

The above-described systems and methods facilitate to monitor subsystems of a wind turbine during operation. More specifically, the subsystems may be operated in accordance with assumptions of the design phase. Furthermore, parameters of the turbine controller may be adapted to simulated expected life times of the subsystems.

Exemplary embodiments of systems and methods for method for monitoring a wind turbine are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a wind turbine, comprising:
defining a subsystem of the wind turbine;
providing a simulation model for the subsystem, wherein the simulation model comprises a transfer function of the subsystem;
determining, during normal operation of the wind turbine, an input parameter of the subsystem;
simulating a behavior of the subsystem using the input parameter as an input of the simulation model, and mapping the input parameter with the transfer function;
determining, based on the simulated behavior, if the subsystem operates within a given specification by comparing an actual output signal of the subsystem with an expected output signal from the simulation model; and
modifying the transfer function when the subsystem is not operating within the given specification so that the actual output signal and the expected output signal substantially match, wherein the modified transfer function represents a drift in a behavior of the subsystem.

2. The method of claim 1, wherein simulating the behavior comprises determining an expected load of the subsystem, and wherein determining if the subsystem operates within a given specification comprises determining if the expected load exceeds a design load of the subsystem.

3. The method of claim 1, further comprising updating a remaining life time of the subsystem.

4. The method of claim 1, wherein determining the input parameter comprises measuring an external condition of the wind turbine.

5. The method of claim 1, wherein the subsystem comprises an active component, wherein the wind turbine further comprises a turbine controller configured to control the active component, and wherein determining the input parameter comprises determining a setpoint of the active component by the turbine controller.

6. The method of claim 1, further comprising measuring an actual output signal of the subsystem, wherein simulating the behavior comprises determining an expected output signal of the subsystem, and wherein determining if the subsystem operates within the given specification comprises determining a difference between the actual output signal and the expected output signal.

7. The method of claim 6, wherein the wind turbine further comprises a turbine controller, the method further comprising at least one of sending a message, raising a warning, changing a control parameter of the turbine controller, and scheduling maintenance of the subsystem when the subsystem is determined not to operate within the given specification.

8. The method of claim 1, wherein comparing the actual output signal with the expected output signal comprises determining a distance between the two signals.

9. The method of claim 8, wherein the distance is a root mean square distance.

10. A method for monitoring a wind turbine, comprising:
defining a first subsystem of the wind turbine;
providing a simulation model for the first subsystem;
receiving, during normal operation of the wind turbine, an input signal and an actual output signal of the first subsystem;
determining an expected output signal of the first subsystem using the input signal as an input of the simulation model, and mapping the input signal with a first transfer function to the expected output signal;
comparing the actual output signal and the expected output signal;
determining, based on the comparison between the actual output signal and the expected output signal, if the first subsystem operates within a given specification; and
determining a second transfer function so that the input signal and the expected output signal substantially match,
wherein comparing the actual output signal and the expected output signal comprises determining a distance between the first transfer function and the second transfer function in a function space.

11. The method of claim 10, wherein the first transfer function and the second transfer function are described by a linear differential equation or a system of linear differential equations involving parameters comprising an eigenfrequency, a damping constant, a gain factor, a phase shift, a delay, or a combination thereof.

12. The method of claim 10, further comprising updating a remaining life time of the first subsystem.

13. The method of claim 10, wherein comparing the actual output signal and the expected output signal comprises determining a difference between the actual output signal and the expected output signal.

14. A system for monitoring a wind turbine, comprising a simulation module which is configured:
to simulate, during normal operation of the wind turbine, a behavior of a subsystem of the wind turbine by mapping an input signal with a first transfer function to an expected output signal;
to determine, based on the simulated behavior, if the subsystem operates within a given specification by comparing an actual output signal of the subsystem with the expected output signal from the simulation module, determining if the actual output signal and the expected output signal substantially match, and wherein determining if the actual output signal and the expected output signal substantially match comprises determining a second transfer function so that the input signal and the expected output signal substantially match, and comparing the actual output signal and the expected output signal comprises determining a distance between the first transfer function and the second transfer function in a function space changing the first transfer function when the actual output signal and the expected output signal do not substantially match to achieve a substantial match; and
to send a message to a turbine controller of the wind turbine when the subsystem is determined not to operate within the given specification based on the changed first transfer function.

15. The system of claim 14, wherein the simulation module comprises a submodule configured to simulate an input-output behavior of the subsystem by the first transfer function, wherein the subsystem comprises a pitch system, a yaw system, a generator system, a power conversion system, a transformer system, or a part thereof.

16. The system of claim 15, wherein the simulation module is configured:
to receive a setpoint from the turbine controller configured to control an active component of the submodule by issuing the setpoint to the subsystem; and
to simulate a response of the subsystem to receiving the setpoint.

17. The system of claim 14, wherein the simulation module is configured:

to receive, during normal operation oldie wind turbine, at least one input parameter determined by a sensor of the subsystem; and to use the at least one input parameter as an input of a simulation module for simulating the behavior of the subsystem.

18. The system of claim 14, wherein the simulation module is configured:

to determine a difference between the actual output signal and the expected output signal; and to determine, based on the difference, if the subsystem operates within the given specification.

* * * * *

UNITED STATES PATENT AND TRADEMARK OFFICE
CERTIFICATE OF CORRECTION

PATENT NO.         : 8,249,852 B2
APPLICATION NO.    : 13/111023
DATED              : August 21, 2012
INVENTOR(S)        : Matthias Thulke It is certified that error appears in the above-identified patent and that said Letters Patent is hereby corrected as shown below:

IN THE SPECIFICATIONS:

In Column 6, Line 4, delete "shalt" and insert -- shaft --, therefor.

IN THE CLAIMS:

In Column 28, Line 36, in Claim 14, delete "determining" and insert -- by determining --, therefor.

In Column 29, Line 1, in Claim 17, delete "oldie" and insert -- of the --, therefor.

In Column 29, Line 4, in Claim 17, delete "of a" and insert -- of the --, therefor.

Signed and Sealed this
First Day of January, 2013

David J. Kappos
*Director of the United States Patent and Trademark Office*